(12) United States Patent
Cox et al.

(10) Patent No.: US 10,179,645 B2
(45) Date of Patent: Jan. 15, 2019

(54) SURFACE TRAVEL SYSTEM FOR MILITARY AIRCRAFT

(71) Applicant: Borealis Technical Limited, North Plains, OR (US)

(72) Inventors: Isaiah W. Cox, London (GB); Joseph J. Cox, Portland, OR (US); Joseph Goldman, Pikesville, MD (US); Rodney T. Cox, North Plains, OR (US)

(73) Assignee: Borealis Technical Limited, Gibraltar (GI)

( * ) Notice: Subject to any disclaimer, the term of this patent is extended or adjusted under 35 U.S.C. 154(b) by 230 days.

(21) Appl. No.: 13/951,404

(22) Filed: Jul. 25, 2013

(65) Prior Publication Data
US 2015/0251751 A1 Sep. 10, 2015
US 2016/0129997 A9 May 12, 2016

Related U.S. Application Data

(60) Provisional application No. 61/675,808, filed on Jul. 25, 2012.

(51) Int. Cl.
*B64C 25/40* (2006.01)

(52) U.S. Cl.
CPC ........... *B64C 25/405* (2013.01); *Y02T 50/823* (2013.01)

(58) Field of Classification Search
CPC .................................................. B64C 25/405
See application file for complete search history.

(56) References Cited

U.S. PATENT DOCUMENTS

| | | | |
|---|---|---|---|
| 2,430,163 A | 11/1947 | Dever | |
| 3,977,631 A | 8/1976 | Jenny | |
| 4,325,317 A * | 4/1982 | Wilford | B63G 11/00 114/261 |
| 4,687,158 A * | 8/1987 | Kettering | B64C 25/001 244/100 R |
| 6,657,334 B1 | 12/2003 | Edelson | |
| 6,838,791 B2 | 1/2005 | Edelson | |
| 7,116,019 B2 | 10/2006 | Edelson | |
| 7,226,018 B2 | 6/2007 | Sullivan | |
| 7,445,178 B2 | 11/2008 | McCoskey et al. | |
| 7,469,858 B2 | 12/2008 | Edelson | |
| 7,891,609 B2 | 2/2011 | Cox | |
| 7,975,960 B2 | 7/2011 | Cox | |
| 8,109,463 B2 | 2/2012 | Cox | |
| 2005/0224642 A1* | 10/2005 | Sullivan | B60L 7/26 244/111 |
| 2006/0065779 A1* | 3/2006 | McCoskey | B64F 1/32 244/100 R |
| 2006/0273686 A1 | 12/2006 | Edelson et al. | |

(Continued)

*Primary Examiner* — Jessica B Wong

(57) ABSTRACT

A surface travel system for military aircraft is provided that enables efficient, quiet, and safe ground operations of one or more aircraft in a wide range of military missions and operations. The surface travel system includes controllable onboard drive means that effectively drives one or more of the aircraft's wheels to move the aircraft autonomously, efficiently, quietly, and safely on any travel surface required for a military mission. The present invention allows the rapid safe deployment of multiple aircraft from tight spaces and enhances the readiness and availability of aircraft for a wide range of military operations.

6 Claims, 1 Drawing Sheet

(56) References Cited

U.S. PATENT DOCUMENTS

| | | | | |
|---|---|---|---|---|
| 2010/0276535 A1* | 11/2010 | Charuel | ................ | B64C 25/405 244/50 |
| 2011/0036939 A1* | 2/2011 | Easter | ....................... | B60F 5/02 244/2 |
| 2012/0104159 A1* | 5/2012 | Charles | ................ | B64C 25/405 244/50 |
| 2012/0104160 A1* | 5/2012 | Baumann | ............... | B64C 25/405 244/50 |
| 2012/0153075 A1* | 6/2012 | Wilson | ................. | B64C 25/405 244/50 |
| 2013/0062466 A1* | 3/2013 | Sweet | .................. | B64C 25/405 244/103 R |
| 2015/0232204 A1* | 8/2015 | Alexander | ............... | B64G 1/40 244/171.1 |

* cited by examiner

SURFACE TRAVEL SYSTEM FOR MILITARY AIRCRAFT

PRIORITY CLAIM

This application claims priority from U.S. Provisional Patent Application No. 61/675,808, filed Jul. 25, 2012, the disclosure of which is fully incorporated herein.

TECHNICAL FIELD

The present invention relates generally to systems for the ground of aircraft and specifically to a surface travel system for military aircraft that moves these aircraft independently, efficiently, and safely on a range of surfaces.

BACKGROUND OF THE INVENTION

The ground operation of military aircraft is very similar to the operation of civilian commercial aircraft. The term "military aircraft," as used herein, is intended to encompass and include any type of aircraft used in military operations or missions capable of travel on a ground or other surface, including, but not limited to, fixed wing jet and propeller driven aircraft, rotorcraft, such as helicopters and the like, as well as unmanned aerial vehicles (UAVs). There are significant differences that make the operation of military aircraft unique. Military aircraft must be able to land and travel on a wide range of surface types, for example, from sand and dirt to the decks of aircraft carriers. Unlike civilian aircraft, they must often be able to land and take off quietly and quickly. In certain situations, multiple military aircraft must be able to roll in and roll out simultaneously, sometimes in relatively constrained spaces. At the present time, military aircraft, like commercial aircraft, must operate the aircraft main engines to move the aircraft on tarmac or any other ground travel surface between landing and takeoff. The use of thrust from an aircraft's engines to move an aircraft during ground surface travel presents many challenges to the efficient and safe operation of all aircraft and to military aircraft in particular.

The environment surrounding an operating aircraft engine is an acknowledged hazard zone because of the dangers to ground personnel and equipment and to the aircraft itself that can accompany jet blast and engine ingestion. Engine ingestion, also referred to as jet intake, can damage engines and other aircraft structures when foreign object debris (FOD) is pulled into an operating aircraft engine, which causes foreign object damage to the engine, potentially compromising the safety of aircraft engine operation. The safety of ground operations can also be significantly compromised by the jet blast from an aircraft jet engine when aircraft engines are kept in operation, even at idle speeds, especially in tight or congested areas with reduced maneuvering space. Jet blast, also known as jet efflux, from any type of engine operating to taxi an aircraft in a congested area virtually guarantees that something will be damaged or someone will be injured. Air currents caused by prop wash from aircraft equipped with propellers or the main and tail rotors of helicopters can also present ground safety challenges. All of the foregoing risks may also be presented when an unmanned aerial vehicle (UAV) type of aircraft taxis with operating engines.

Jet blast data, measured from an aircraft's tail with the engines at low RPM settings, indicates that the damage profile can extend from outboard wing-mounted engines to more than 200 feet beyond some larger aircraft. Within this area, jet engines can generate hurricane-level exhaust forces of almost 100 knots. Most of the reported jet blast damage incidents typically occur during pushback, power back, taxi-out, or taxi-in. The position of the operating jet engines relative to ground equipment, people, and other aircraft can significantly influence the occurrence of jet blast damage incidents when breakaway power is applied. Aircraft with engines powered and in the process of turning are frequently involved in jet blast damage incidents. Using powered engines to maneuver an aircraft without assistance from a tractor or tug is highly likely to compromise ground safety. The presence of a tractor or tug, however, is not likely to prevent jet blast damage if the aircraft's engines are running and the aircraft is in the process of making a sharp turn. Careful management of an engine-powered military aircraft when the aircraft moves on the ground is required to prevent damage from jet blast or propeller operation, particularly in congested areas.

Positioning a jet or other type of military aircraft so that the forward thrust is directed away from people and equipment is helpful, but the direction of the jet blast can change as the aircraft is maneuvered on the ground or other surface. This occurs, for example, during power back operations, when the flight crew employs engine thrust reversers to direct thrust ahead of the aircraft to push the aircraft backward, changing the direction of the jet blast. Damage to other aircraft and/or to ground vehicles or ground personnel remains a distinct possibility as long as an aircraft's engines are running. Suggestions for preventing jet blast damage thus far have been limited to, for example, avoiding sharp turns on taxi-in or pushback with one or more engines running, and using tractors or tugs to move taxiing aircraft. The use of jet blast deflectors and improving ground crew vigilance, communication, and the handling of ground vehicles may reduce damage. As long as engines are operating while aircraft are on the ground, however, jet blast continues to be a hazard. Propeller driven military aircraft present their own safety challenges, and, while different, prop wash produced by operating engines and propellers still poses hazards to vehicles and personnel in the vicinity of the aircraft.

As noted above, operating military aircraft engines while the aircraft is on the ground may result in engine ingestion. The operation of an aircraft engine, whether it is a jet engine or a gas or turbine engine with an attached propeller, creates a low pressure area in the engine inlet, which causes a large quantity of air from the area forward of the inlet cowl to move into the engine. The velocity of the air nearest the inlet is much greater than the velocity of the air farther from the inlet. As a result, the amount of engine suction close to the inlet is significant and may be high enough to pull tools, equipment, and even people into the engine. To avoid the possibility of serious injury or, in rare cases, death, it is necessary for ground personnel and ground vehicles to keep a safe distance from an operating aircraft engine. The hazard or danger zone around one type of aircraft with an engine operating at idle power extends for a radius of about 9 feet (2.7 m) from the center of the engine and about 4 feet (1.2 m) back toward the engine cowl. This hazard zone increases to a radius of about 13 feet (4 m) and a distance toward the cowl of about 5 feet (1.5 m) when the aircraft engine is operating just above idle power. At higher power levels, the hazard zone increases to at least 100 feet (30.5 m) in front of the engines and at least 200 feet (61 m) behind the engines. The extent of the engine ingestion hazard zone may be increased by wind or weather conditions. Where the engine ingestion hazard zone ends in the vicinity of the engine cowl, the exhaust hazard area begins, and damage or injury from jet blast hazard is also possible. The dangers associated with operating aircraft turbines, whether they are pure jet engines, turboprop engines, or helicopter rotors, cannot be overstated. Even after an aircraft engine is shut off completely, the possibility of engine ingestion may exist for a period of about 30 seconds. Military aircraft often must operate in locations where the area of clearance around an operating engine required to avoid engine ingestion is not available.

Foreign object damage to aircraft engines from foreign object debris (FOD) picked up from adjacent ground areas by engine ingestion is a major cause of reduced engine life. Under-wing engines literally vacuum FOD from the ground, causing engine damage that can ground aircraft for expensive and time-consuming engine overhauls. Since many military aircraft must land on surfaces that are rough and may be covered with or composed of dirt, rocks, and/or sand, the ingestion of FOD from these surfaces can pose significant challenges to the continued effective operation of the aircraft engines, to the aircraft, and, ultimately, to the mission.

An aircraft can be moved in reverse from a parked position by starting the aircraft's main engines and reversing them to drive the aircraft in a reverse direction during push back or at other times. However, this process, known as reverse thrust, is problematic and can be dangerous. An aircraft engine operating in reverse thrust pulls FOD from the aircraft's environment into the engine and throws it forward. The potential for injury from FOD to ground personnel, ground vehicles, and airport or other structures where military aircraft are operating during this process can be significant. The use of reverse thrust is prohibited in many locations, moreover. Dependence on the use of an arriving or departing aircraft's main engines is neither a safe nor a reliable procedure.

In addition to the turbulence and noise created by an aircraft's engines operating in reverse thrust, as well as in idle thrust or taxi thrust, the adverse impact on air quality and fuel costs must be considered. It has been estimated that about 3200 pounds of fuel is used in an hour by an idling aircraft engine. An aircraft's engines idling between push back and takeoff, even if only about 20 minutes a day, can increase fuel costs by millions of dollars over a fleet.

In some situations, it is necessary for multiple military aircraft to conduct both push back and landing virtually simultaneously. Currently, adjacent and simultaneous stand operations are often limited significantly when surface space for multiple aircraft is tight. Moreover, jet blast deflectors are required since these multiple aircraft are simultaneously rolling in or out with their engines operating.

If tugs are used, this strains not only the available towing equipment, but also the available ground personnel. When military aircraft require tugs for push back, departures may be delayed and turnaround times can be adversely affected when tow bars, adapters, tugs, or ground crews are not available when needed. In some locations where military missions are conducted, tugs are simply not available, and aircraft must move in reverse as described above. If an aircraft is damaged during roll in or roll out in a tight space or causes damage to another aircraft when multiple aircraft must simultaneously deploy from this space, and the damage is not detected prior to takeoff because ground crew were busy elsewhere, aircraft safety and the aircraft's mission could be compromised.

The ground movement of an aircraft without the operation of the aircraft's engines has been proposed. U.S. Pat. No. 2,430,163 to Dever; U.S. Pat. No. 3,977,631 to Jenny; U.S. Pat. No. 7,226,018 to Sullivan; and U.S. Pat. No. 7,445,178 to McCoskey et al, for example, describe various drive means and motors intended to drive aircraft during ground operations. None of the foregoing patents, however, suggests a surface travel system specifically designed to move military aircraft quietly, efficiently, and safely on a wide range of travel surfaces. U.S. Pat. No. 7,469,858 to Edelson; U.S. Pat. No. 7,891,609 to Cox; U.S. Pat. No. 7,975,960 to Cox; and U.S. Pat. No. 8,109,463 to Cox et al, owned in common with the present invention, describe aircraft drive systems that use electric drive motors to power aircraft wheels and move an aircraft on the ground without reliance on aircraft main engines or external vehicles. While these drive systems and the various drive system features disclosed can effectively move aircraft on the ground, it is not suggested that they can move aircraft as required in military applications.

A need exists, therefore, for a surface travel system specifically designed to move military aircraft autonomously on a wide range of surfaces and surface conditions efficiently, quietly, and safely without the hazards that accompany operating aircraft engines in a manner that promotes the effectiveness and success of the aircraft's mission.

SUMMARY OF THE INVENTION

It is a primary object of the present invention, therefore, to provide a surface travel system specifically designed to move military aircraft autonomously on a wide range of surfaces and surface conditions efficiently, quietly, and safely without the hazards that accompany operating aircraft engines in a manner that promotes the effectiveness and success of the aircraft's mission.

It is another object of the present invention to provide a surface travel system for military aircraft that minimizes foreign object damage from foreign object debris when a military aircraft is required to land and taxi on sand, dirt, and like surfaces.

It is an additional object of the present invention to provide a surface travel system for military aircraft that reduces hazards to ground personnel and equipment from jet intake, prop clearance, jet blast, prop wash, and rotor operation.

It is a further object of the present invention to provide a surface travel system for military aircraft that enables the simultaneous safe and efficient rapid deployment of multiple military aircraft.

It is yet another object of the present invention to provide a surface travel system for military aircraft that maximizes all aspects of deck utilization, as well as deck, elevator, and storage operations when the travel surface is the deck of a ship or an aircraft carrier.

It is yet an additional object of the present invention to provide a surface travel system for military aircraft that reduces the per-aircraft operational footprint without compromising safety.

It is yet a further object of the present invention to provide a surface travel system for military aircraft that simplifies forward staging of aircraft in a range of military operations.

It is a still further object of the present invention to provide a surface travel system for military aircraft that is fuel efficient and extends a military aircraft's airborne range and mission flexibility.

It is still another object of the present invention to provide a surface travel system for military aircraft that minimizes stress on and damage to aircraft structures and thus maximizes the availability and readiness of the aircraft for military missions.

In accordance with the aforesaid objects, a surface travel system for military aircraft is provided that enables efficient, quiet, and safe ground operations of one or more aircraft in a wide range of military missions and operations. The surface travel system includes controllable onboard drive means that effectively drives one or more of the aircraft's wheels to move the aircraft autonomously, efficiently, quietly, and safely on any travel surface required for a military mission without reliance on the aircraft's operating engines or tow vehicles. The present invention allows the rapid safe deployment of multiple aircraft from tight spaces and enhances the readiness and availability of aircraft for military operations.

Other objects and advantages will be apparent from the following description, claims, and drawing.

DETAILED DESCRIPTION OF THE INVENTION

Military aircraft are required to perform a variety of missions and operations under a range of conditions that may be less than ideal. Surface areas available for landing, surface travel, and takeoff are often quite primitive and rough, especially when compared with the relatively smooth tarmac surfaces found in civilian airports and at many military bases and airfields. The ability of an aircraft to land and take off quickly, efficiently, quietly, and safely virtually anywhere enhances its value and effectiveness in military operations. The present invention provides this capability. An aircraft equipped with the present surface travel system may effectively maneuver autonomously without operation of its main engines on virtually any surface and within tight spaces while avoiding the hazards associated with ground engine operation discussed above. Whether the surface is desert sand or the deck of an aircraft carrier, the present system provides a fuel efficient and quiet way to move aircraft between landing and takeoff or otherwise on the surface while minimizing damage to the aircraft and adjacent persons or objects and maximizing safety of military aircraft surface operations.

One of the main causes of reduced engine efficiency in flight for military and other aircraft is engine damage resulting from FOD, which may include almost anything close enough to an operating engine to be sucked into the engine nacelle and the area close to rotating engine turbines. If the FOD includes almost any material in sufficient quantity, such as, for example, sand, rocks, aircraft bolts, maintenance tools, bits of runway paving, soft drink cans, or plastics, this material is sucked through the turbine blades and causes damage ranging from clogging to small scratches to large dents. What appears to be a small amount of turbine damage can produce inefficiencies in blade operation, which causes blade blending. Over time, this type of damage, corrected or uncorrected, accumulates and will interfere with engine efficiency. An inefficiently operating engine uses more fuel during flight than an efficiently operating engine. An engine that has not been damaged by FOD can operate with greater efficiency and, thus, less fuel during flight, which is a significant benefit when military operations are conducted in areas where fuel may not always be readily available. With the present surface travel system, turbine blades are less likely to accumulate FOD damage, in large part because the engines operate only minimally when the aircraft is on the ground. Consequently, engine turbines are cleaner and run better while the aircraft is in flight, which leads to significant, measurable fuel savings and may expand the range of an aircraft during a military operation. The present surface travel system additionally avoids grounding aircraft for expensive and time-consuming engine overhauls as a result of FOD damage.

Figure 1:
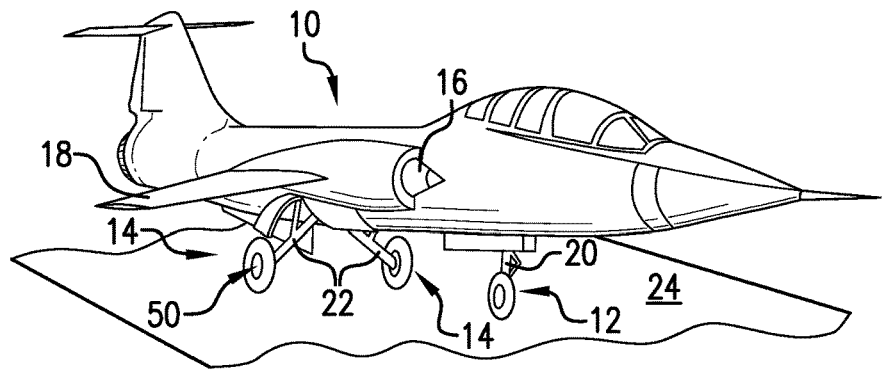
FIG. 1 illustrates, in side view, one type of military aircraft equipped with a surface travel system in accordance with the present invention on a travel surface.

Referring to the drawings, FIG. 1 illustrates, in side view, one type of military aircraft 10 with which the surface travel system of the present invention may be used effectively. This aircraft has a tricyclic arrangement of wheels and includes a single nose landing gear wheel 12 and two single main landing gear wheels 14. This particular aircraft has jet engines mounted with the wings. A single engine 16 and wing 18 are shown. The nose landing gear wheel 12 is mounted on a strut 20, and each main landing gear wheel 14 is mounted on a strut 22. This type of aircraft 10 could land and take off from the deck of an aircraft carrier, represented as surface 24.

Figure 2A:
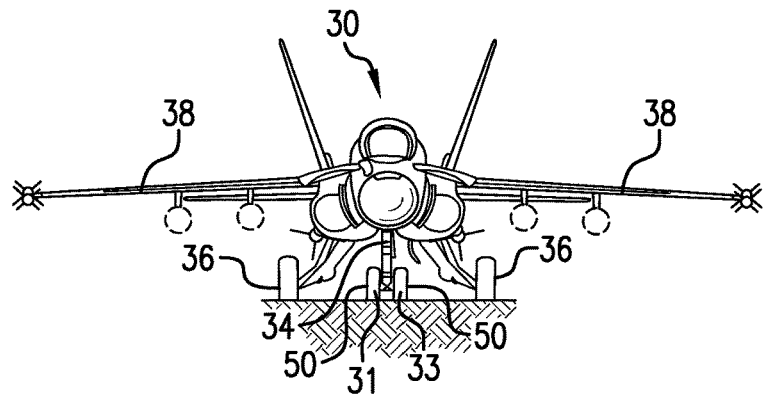
FIGS. 2a and 2b are respective front and side views of a second type of military aircraft equipped with a surface travel system in accordance with the present invention on a travel surface.
Figure 2B:
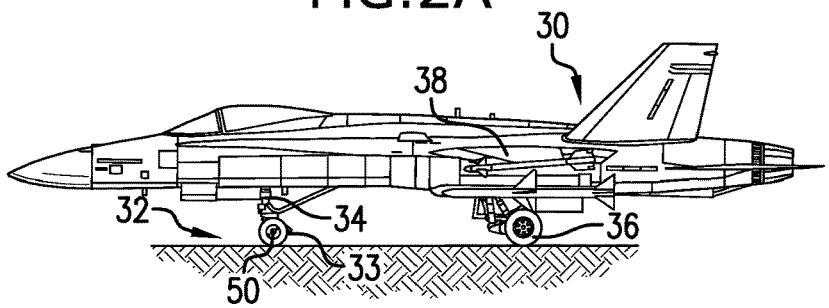

FIGS. 2a and 2b illustrate, in front and side views respectively, a second type of military aircraft 30 with a different arrangement of nose and main landing gear wheels than the aircraft 10 of FIG. 1. Aircraft 30 is equipped with a surface travel system as described herein. The wheel configuration in this type of military aircraft includes a nose landing gear 32 with a pair of wheels 31 and 33 mounted on a strut 34. Main landing gear wheels 36 are attached to the aircraft 30 under the wings 38 of the aircraft.

Figure 3:
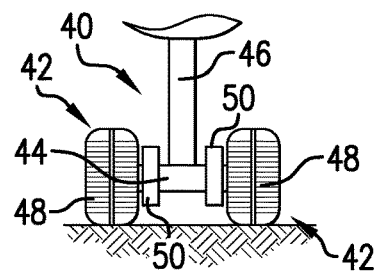
FIG. 3 is a schematic drawing of one embodiment of a drive system for the military aircraft surface travel system of the present invention.

FIG. 3 illustrates one embodiment of a surface travel system 40 according to the present invention mounted in connection with a pair of aircraft landing gear wheels, such as the nose landing gear wheels 31 and 33 of the aircraft 30 shown in FIGS. 2a and 2b. The pair of wheels shown in FIG. 3 could be a pair of nose landing gear wheels or a pair of main landing gear wheels. The present surface travel system could be mounted to drive one or more of either or both types of wheels to move an aircraft on a travel surface. For purposes of illustration and discussion only, the surface travel system 40 will be described as mounted to drive a pair of nose landing gear wheels, but could apply equally to a pair of main landing gear wheels or to a single aircraft wheel, such as the single nose wheel 12 of aircraft 10. The surface travel system 40 includes a pair of wheels 42, each of which is rotatably mounted on an axle 44 attached to a landing gear strut 46. On each wheel 42 is mounted a tire 48. If it is known on what type of travel surface the aircraft will be required to land, move, and take off, the tires 48 may be selected accordingly. Ideally, an aircraft will be provided with appropriate tires for the surfaces on which it most often lands and moves. An aircraft that must land and maneuver on sand, for example, may require a different tire than an aircraft that lands and travels on ice. Even if the tires are not specifically designed for a particular landing or travel surface, however, operation of the surface travel system has been found to permit aircraft movement on adverse surfaces and may, therefore, enhance the flexibility of military aircraft to land and travel on multiple different surfaces during a mission.

The present surface travel system may include one or more onboard drive means, represented at 50, that are controllable to drive an aircraft wheel and move the aircraft in a desired direction on a travel surface independently of and without reliance on the aircraft's main engines or external tow vehicles. The drive means 50 may be mounted inboard of the wheels 42, as shown, or in any convenient location, including, without limitation, outboard of the wheels, within the wheel volume, and/or in another location remote from the wheels. Although a pair of drive means 50 is shown in FIG. 3, a single drive means may also be used to drive a single nose or main landing gear wheel, such as the single nose wheel 12 and single main wheels 14 in the aircraft in FIG. 1. To illustrate, a drive means 50 is shown mounted with a main landing gear wheel 14 on aircraft 10 in FIG. 1, and a drive means 50 is shown mounted with each of the nose landing gear wheels 31 and 33 on aircraft 30 in FIGS. 2a and 2b.

A drive means 50 preferred for use with the surface travel system for military aircraft of the present invention is an electric motor assembly that is capable of operating at high speed and could be any one of a number of suitable designs. An example of one type of drive means that could be used effectively in the present system is an inside-out electric motor in which the rotor can be internal to or external to the stator, such as that shown and described in U.S. Patent Application Publication No. 2006/0273686, the disclosure of which is incorporated herein by reference. A range of motor designs capable of high torque operation across a desired speed range that can move an aircraft wheel on surfaces traveled by military aircraft and function as described herein may also be suitable drive means in the present drive wheel system. A high phase order electric motor of the kind described in, for example, U.S. Pat. Nos. 6,657,334; 6,838,791; 7,116,019; and 7,469,858, the disclosures of the aforementioned patents are incorporated herein by reference, may be effectively used as a drive means 50. One type of suitable drive means 50 is a high phase order induction motor with a top tangential speed of about 15,000 linear feet per minute and a maximum rotor speed of about 7200 rpm, although drive means capable of a wide range of such speeds may be used effectively with the present military aircraft surface travel system. Other drive means, including hydraulic and/or pneumatic drive means, are also contemplated to be within the scope of the present invention.

Most military aircraft currently use turbines to provide the motive power required for flight and are equipped with an auxiliary power unit (APU). The APU is the preferred source of electric power for powering drive means that require electric power. An APU should be set to produce an acceptable acoustic footprint for a military aircraft's mission. An unmanned aerial vehicle (UAV) or other stealth aircraft, for example, should have no detectable acoustic footprint. In the event that an aircraft does not have an APU or the APU is inoperative or otherwise unavailable for supplying electric power, an aircraft's main engine's generator could be used as a back-up power source. Other power sources may also be used to supplement or replace the APU as a source of power. These power sources may include, for example without limitation, batteries, fuel cells, any kind of solar power, POWER CHIPS™, and burn boxes, as well as any other power source suitable for this purpose. Control of the flow of current to the drive means, as well as the voltage and frequency of the current, allows the torque generated by the drive means to be controlled and, therefore, the speed of the wheel powered by the drive means and the surface travel speed of the aircraft to be controlled. A power source may be located in any convenient location where it can effectively supply power to a drive means.

The surface travel system of the present invention further enables a military aircraft on which it is installed to move very precisely, whether under pilot or ground control, and additionally allows an aircraft to move in reverse without reducing safety margins, thus maximizing utilization of the surface area on which the aircraft is moving. This kind of precise movement may be achieved when, like aircraft 30 in FIGS. 2a and 2b, an aircraft has a pair of nose landing gear wheels, and each nose wheel is equipped with a drive means controllably mounted to drive a respective nose landing gear wheel at a different speed or torque. The differential speed or torque of each nose wheel enables the turning radius of the aircraft to be quite small and reduced significantly compared to the turning radius of an aircraft in which surface movement is powered by the aircraft's engines. The differential speed of the two nose wheels can also be used to brake the aircraft without actual application of the aircraft's brakes. The smaller maneuvering area needed by an aircraft with the present surface travel system makes available more ground surface area for utilization by other aircraft or for other uses.

When multiple military aircraft equipped with the present surface travel system are required to roll in, roll out, or otherwise deploy rapidly, ground personnel are no longer endangered, and adjacent stand operations can be conducted to support this rapid deployment without the need for jet blast deflectors. Aircraft can move immediately to an active runway while simultaneously undergoing the lengthy engine start and preflight check process, which shortens the time to wheels up. Surface operations may be conducted efficiently in tight spaces, for example on the deck of an aircraft carrier, when the risks from FOD, engine intake, and jet blast are eliminated.

The present surface travel system further eliminates side-load landing gear stress, permitting tighter turns and corners during aircraft surface maneuvers. Aircraft equipped with drive means and the present surface travel system can move easily and effectively in reverse. This reverse capability means that more aircraft can be parked closer together, which frees valuable tarmac or aircraft carrier deck space. The present invention, therefore, reduces the per-aircraft operational footprint.

Military aircraft may often be required to conduct forward operations in environments that are quite different from the environment of a commercial civilian airport. The autonomous surface operations possible with the present invention provide military aircraft with a level of flexibility not heretofore available. Both ground personnel and ground support equipment may be eliminated or reduced in host countries of forward bases. In many cases, no standing equipment or personnel are required to be present at an airfield or other landing site. Often military aircraft landing sites are make-shift airstrips with only minimal space to maneuver an aircraft. The ability to taxi backward provided by the present system is very useful when an aircraft must land and take off from such a site. When a military aircraft is engaged in covert operations, the ability to move quietly and stealthily on virtually any surface made possible by the present system enables "land, crawl, and peek/strike" operations. The elimination of engine use for UAVs or manned aircraft also eliminates the dust, noise, and heat signature that accompanies engine use and reduces their effectiveness.

The present surface travel system also simplifies forward staging of military aircraft, including, but not limited to, aircraft used for strikes, reconnaissance, military passengers, and ambulances in military operations. The airborne range of an aircraft equipped with the present system, as well as the length of time-over-target, are both effectively extended. Additionally, significant reductions in response times can be achieved, which can extend mission flexibility, since high readiness for action is possible in aircraft equipped with the present surface travel system Other significant benefits are realized by aircraft using the present surface travel system. Because the aircraft's APU, not the main engines, provides the fuel to power the system drive means, much less fuel is wasted during ground operations. An F-16 aircraft today typically burns more than 1,000 pounds of fuel before takeoff. Most of this fuel is now available for use during flight, which, as noted above, extends an aircraft's airborne range. Emissions are reduced when fuel use is reduced; therefore, the present system provides a more environmentally friendly option for controlling aircraft ground or surface movement than aircraft engine use. Further, at least one branch of the military, the Air Force, is a leading champion of the use of biofuels, which would make the operation of military aircraft with the present invention an especially green option.

The present surface travel system also produces less stress on an aircraft's airframe and less brake wear, which can extend the aircraft's useful life. Tugs and tow vehicles, which can stress and damage the airframe, are not required, and this source of reduced aircraft life is eliminated. Since the engine is not working against the brakes during taxi, brakes do not experience the wear produced during engine powered surface movement. When the drive means of the present surface travel system is mounted within an aircraft wheel, the heat that may be generated during surface travel can effectively deice the wheels and landing gear wheel well space when the aircraft is in flight.

As noted above, aircraft equipped with the surface travel system of the present invention are able to move efficiently, effectively, and safely on a wide range of surfaces, which includes the decks of aircraft carriers and other ships. The present system can maximize flight deck utilization on carriers by eliminating or reducing the need for tugs, which avoids tug-related safety risks and delays. Deck operations can also be more flexible without tug-related risks and delays, and flight deck clutter can be reduced when these extra vehicles are not required to be present.

While the present invention has been discussed primarily with respect to fixed wing jet aircraft, other types of military aircraft are also contemplated to be within the scope of the surface travel system described herein. For example, rotorcraft, such as helicopters, are widely used by the military, and their versatility is enhanced by the benefits in surface travel produced by the present invention. Vertical takeoff and landing (VTOL) aircraft generally can achieve more effective surface travel, as can short takeoff and landing (STOL) aircraft. These aircraft are often required to land on ship decks, where the present surface travel system can enable their surface movement and achieve the advantages described above that accompany autonomous surface movement of an aircraft without operation of their engines.

While the present invention has been described with respect to preferred embodiments, this is not intended to be limiting, and other arrangements and structures that perform the required functions are contemplated to be within the scope of the present invention.

INDUSTRIAL APPLICABILITY

The surface travel system of the present invention will find its primary applicability in military aircraft where it is desired to obtain the safety and efficiency advantages of moving aircraft on ground and other surfaces without the hazards and risks associated with engine operation-powered surface movement and the flexibility advantages and precision of action required for military operations.

The invention claimed is:

1. A method that allows rapid safe deployment of multiple military aircraft between tight spaces on aircraft carriers and locations of military operations sites with rough surfaces, comprising:
   a. in military operations requiring the rapid safe deployment of the multiple military aircraft between the tight spaces on the aircraft carriers, the tight spaces providing limited per-aircraft operational footprints, and the locations of the military operations sites with the rough surfaces comprising sand and dirt surfaces, providing the multiple military aircraft to conduct the military operations, each of the multiple military aircraft having a tricyclic arrangement of one or a pair of nose landing gear wheels and spaced single main landing gear wheels;
   b. mounting a high phase order electric drive motor within a wheel volume of the one or the pair of nose landing gear wheels powered by an auxiliary power unit on each of the multiple military aircraft to equip each of the multiple military aircraft for independent forward and reverse movement within the tight spaces on the aircraft carriers and on the rough sand and dirt surfaces at the locations of the military operations sites;
   c. with only the electric drive motors, driving and maneuvering the equipped multiple military aircraft independently in a forward direction and in a reverse direction within the limited per aircraft operational footprints within the aircraft carrier tight spaces prior to deployment of the equipped military aircraft from the aircraft carriers to the locations of the military operations sites;
   d. at the locations of the military operations sites with the rough sand and dirt surfaces, driving and maneuvering the equipped multiple military aircraft deployed to the locations independently in the forward direction and in the reverse direction with only the electric drive motors on the rough sand and dirt surfaces as required to conduct the military operations; and
   e. when the equipped multiple military aircraft return to the aircraft carriers from the locations of the military operations sites, driving and maneuvering some of the returning equipped multiple military aircraft within the limited per-aircraft operational footprints independently in the forward direction and the reverse direction with only the electric drive motors to park the some of the returning equipped multiple military aircraft, and driving and maneuvering others of the returning equipped multiple military aircraft within the limited per-aircraft operational footprints independently in the forward direction and the reverse direction with only the electric drive motors onto elevators and to aircraft carrier storage areas.

2. The method of claim 1, further comprising conducting the military operations with the deployment of each of the equipped multiple military aircraft comprising vertical takeoff and landing aircraft, rotorcraft, or helicopters between the aircraft carriers tight spaces and the locations of the military operations sites with the rough sand and dirt surfaces.

3. The method of claim 1, further comprising mounting the high phase order electric drive motors within the wheel volumes of each one of the pair of nose landing gear wheels, and controlling the high phase order electric drive motors to drive each one of the pair of nose landing gear wheels at a different speed or torque while maneuvering each of the equipped multiple military aircraft in the forward direction and the reverse direction in the tight spaces on the aircraft carrier and on the rough sand and dirt surfaces at the locations of the military operations sites.

4. The method of claim 1, further comprising at the locations of the military operations sites, driving and maneuvering each of the equipped multiple military aircraft on the rough sand and dirt surfaces with only the electric drive motors, and conducting the military operations without support from ground personnel or equipment.

5. The method of claim 1, further comprising providing each of the multiple military aircraft with a tricyclic arrangement of one nose landing gear wheel and the spaced single main landing gear wheels and mounting the electric drive motor within the wheel volume of the single nose landing gear wheel.

6. The method of claim 1, further comprising powering the high phase order electric drive motors with the auxiliary power units on each of the multiple military aircraft set to produce an acoustic footprint acceptable for conducting the military operations at the locations of the military operations.

* * * * *